March 23, 1948. D. ROEDER ET AL 2,438,455
TRANSMISSION OPERATING DEVICE AND INTERLOCK
Filed July 26, 1945  2 Sheets-Sheet 1
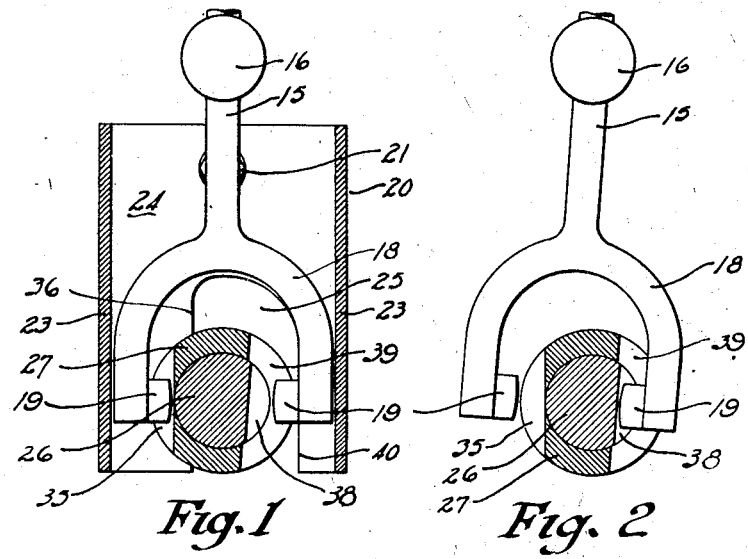
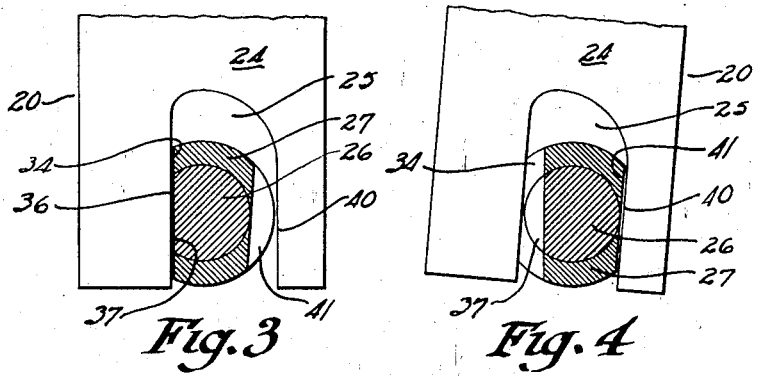
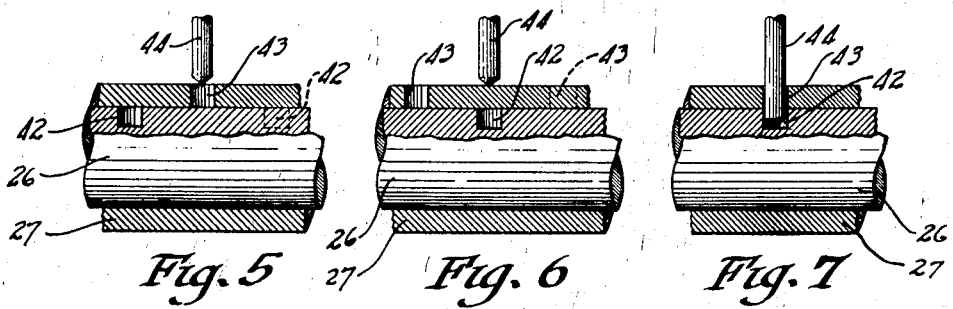
INVENTORS
D. ROEDER
H.L. BROCK

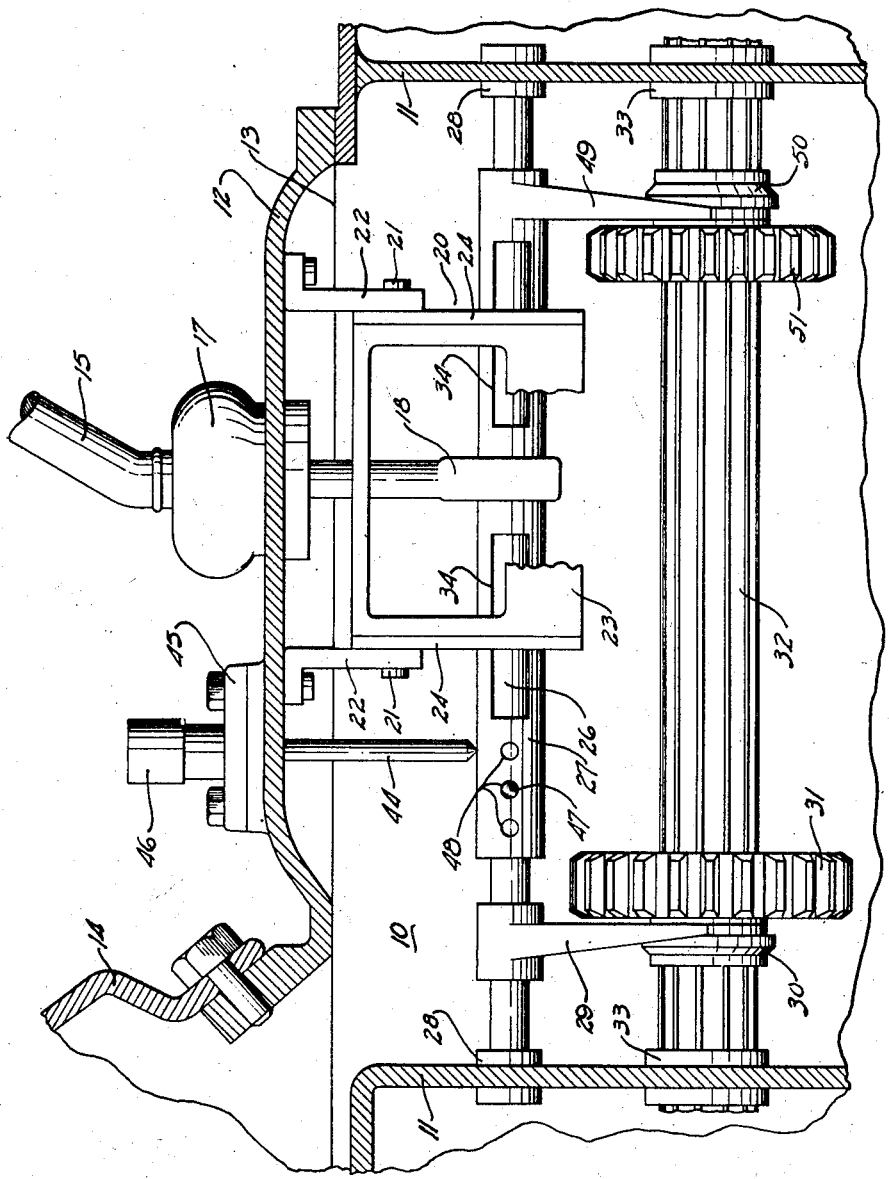

Patented Mar. 23, 1948

2,438,455

UNITED STATES PATENT OFFICE 2,438,455

TRANSMISSION OPERATING DEVICE AND INTERLOCK

Dale Roeder and Harold L. Brock, Detroit, Mich., assignors to Ford Motor Company, Dearborn, Mich., a corporation of Delaware Application July 26, 1945, Serial No. 607,209

10 Claims. (Cl. 74—477)

This invention relates to operating devices for sliding gear transmissions; and, more particularly, to an operating device for such a transmission in which the sliding gear for the operating forks is mounted on concentrically arranged shafts, together with a simple interlocking means prohibiting the operation of the engine starter switch while the transmission is in other than neutral gear engagement.

It is customary in sliding gear transmissions to provide operating forks for the sliding gears which are slideably mounted on shafts paralleling the transmission shafts proper; and which are adapted to engage certain of the gears slideably mounted on an adjacent transmission shaft in order to shift them to various positions of interengagement. In the standard three forward speed and reverse transmission, there are two such forks mounted on two parallel shafts, and either of these forks may be engaged selectively and moved to either of two positions of reciprocation, thus giving four different gear engagements. In the present transmission operating device, rather than mounting the shifter forks slideably on rods, the shifter rods carry the shifter forks directly and move with them; and, moreover, the shifter forks have their associated shafts arranged concentrically. Thus, one of the shifter fork shafts is reciprocally mounted in the transmission housing and the other shifter fork shaft—in the form of a sleeve—is reciprocably mounted on the first shifter shaft. This construction has decided advantages in the way of compactness and ease of operation and is particularly adapted for use in tractors in which such compactness and the notably increased durability makes it most desirable. In addition, it readily lends itself to use with a starter interlocking mechanism which, in the interest of safety, is practically mandatory on vehicles of this type. For further discussion on this point, attention is directed to United States Patent 2,241,677, to L. S. Sheldrick, showing another form of starter-transmission interlock. It suffices to say here that the present interlock is much simpler in operation and more economical to install than that shown in the cited patent or in the prior art since, because in the concentric arrangement of the shifter fork shafts, no auxiliary apparatus is needed for the interlock.

With these and other considerations in view, the invention consists of the structure, described in the specification, claimed in the claims and shown in the accompanying drawings in which:

Figures 1, 2, 3 and 4 each shows a transverse sectional elevation through the operating device showing the various phases of engagement, namely:

Figure 1 shows the transmission operating fork position for first and reverse speeds and the yoke engagement.

Figure 2 shows the transmission operating fork position for second and third speeds.

Figure 3 shows the locking cage position for first and reverse speeds.

Figure 4 shows the locking cage position for second and third speeds.

Figures 5, 6, and 7 are transverse sectional elevations through the shifter fork shafts showing the respective position of reciprocation, namely:

Figure 5 shows the extremes of reciprocation of the center shaft for second or third speeds.

Figure 6 shows the extremes of reciprocation of the outer shaft or sleeve for first or reverse.

Figure 7 shows the alignment obtaining in both shaft and sleeve in the neutral position, together with the permissive range of operation of the starter interlock.

Figure 8 is a longitudinal sectional elevation through the transmission portion of a tubular frame tractor showing the improved transmission operating mechanism.

Referring first to Figure 8, a portion of the tubular frame of a tractor comprising the transmission section is shown, laterally enclosed between the sidewalls 10 of the tractor frame and transversely between the webs 11. Reference is again made to the patent cited above which details this construction somewhat more fully. The transmission section is closed by a cover plate 12 secured over an aperture 13 on the top of the substantially tubular frame and to this is attached the steering gear housing 14. A substantially vertical gearshift lever 15 is universally mounted in a ball joint 16 (but is actually moved in the conventional H pattern, see Figure 1 or 2) enclosed within the housing 17 which is secured, in turn, to the cover plate 12. The gearshift lever 15 terminates in a fork 18 having operating pins 19 oppositely and inwardly disposed at its lower end. A cage or yoke 20 is pivotally secured at 21 to angles 22 secured to the cover plate 12. While this may be made in several forms, in the present case the inner surfaces 23 of the sides of the yoke may engage the outer surfaces of the fork 18 on either side so that on traversal of the fork 18, the yoke moves correspondingly about its pivot transversely of the transmission, there being a slight clearance between the walls of the yoke and the surface of the fork to allow for the offset between the ball joint 16 and the pivot 21. The ends 24 of the yoke 20 each have substantially rectangular cutout section 25 which fits over and selectively engages the concentrically arranged shifter fork shafts: the inner shaft for second and third speeds being designated 26 and the outer sleeve shaft for first and reverse being designated 27. The inner shaft 26 is reciprocally journaled in bearings 28 in the opposite transverse webs 11 and has a shifter fork 29 for activating second and third speed gear engagement fixed for reciprocation on it. Fork 29 engages the collar 30 on one of the transmission gears 31 which is slideably mounted on the splined transmission shaft 32 rotatably mounted on the bearings 33 in the webs 11. The transmission showing is merely illustrative of the application of the present operating device to any of the common forms of sliding gear transmission.

The sleeve 27 has, on one side, two longitudinally spaced cutout portions 34; and, centrally disposed between them and behind the fork 18 in Figure 8, a sleeve operating slot 35 which—as shown in Figure 1—is engaged by one of the pins 19 when the gearshift lever 15 moves on one leg of the H in the first or reverse position. Lateral reciprocation of the lever 15 will then move the sleeve 27 and its associated fork 49 rearwardly or forwardly on the shaft 26. At the same time, as shown in Figure 3, the yoke 20 is in its counterclockwise position, being propelled in that direction about its pivot 21 by the similar movement of the lever 15 and the left-hand edge 36 of the openings 25 in each end 24 of the yoke moves into a shaft locking slot 37 in the center shaft 26, these slots being aligned in Figure 8 with the ends 24 of the yoke 20. Thus, the shaft 26 is restrained from reciprocation, while the sleeve or outer shaft 27 moves forwardly or backwardly in response to inverse movement of the lever 15.

On the other hand, when the lever 15 is moved to the clockwise position on the other leg of the H—as shown in Figures 2 and 4—preparatory to engaging second or third speeds, the left-hand pin 19 on the fork 18 moves out of the sleeve operating slot 35 in the sleeve 27 and the right-hand pin 19 moves into a shaft operating slot 38 on the opposite side of the central shaft 26. The center portion of the sleeve 27 is cut away for a considerable extent on its opposite side on either side of the shaft operating slot 38 in the center shaft, as indicated at 39, so that on reciprocation of the lever 15 the shaft 26 is actuated backwardly or forwardly without interference with the sleeve 27. However, the sleeve 27 is further locked in position by means of the yoke 20 moving to the clockwise position shown in Figure 4 in which case the right-hand edge 40 of the opening 25 in each end 24 of the yoke 20 moves into a sleeve locking slot 41 in the sleeve 27. These sleeve locking slots are initially substantially aligned with the ends 24 of the yoke 20 and directly opposite to the corresponding shaft locking slots 37 in the center shaft 26. The yoke 20 then secures the sleeve 27 against reciprocation in response to the forward and backward movement of the lever 15. It is thus possible to move the shifter fork 29 attached to the shaft 26 into the two extreme positions of reciprocation to obtain the desired gear engagement while holding the sleeve 27 and its associated fork 49 (which engages the collar 50 on the gear 51) in the neutral central position.

Figure 5 shows the extent of movement of the central shaft 26 with reference to the relative positions of the starter interlock openings 42 and 43 in the shaft 26 and the sleeve 27, respectively. In this view, since the center shaft 26 is being reciprocated, the opening 43 in the sleeve 27 is in the median or neutral position corresponding to the position of the starter interlock rod 44. The reciprocative position of the shaft 26 (and the opening 42) for third speed is shown in full line and that for second is shown in dotted line. Correspondingly, in Figure 6, the extent of reciprocative movement of the sleeve 27 is shown in the same manner. There the center shaft 26 is locked in the median or neutral position and the opening 43 in first speed is shown in full line and for reverse in dotted line. Since the shaft 26 is in neutral position, its opening 42 is then closed centrally of these two positions. When both shaft and sleeve are in the median or neutral position, the openings 42 and 43 are in alignment, as shown in Figure 7. Referring again to Figure 8, it will be noted that a starter switch 45 having a depressible button 46 is mounted on the cover plate 12 forwardly of the ball joint housing 17; and the starter interlock rod 44, referred to above, is connected to and depressed with the button 46. When both shaft and sleeve are in the neutral position, as shown in Figure 7 and the openings 42 and 43 aligned, it is possible to depress the button 46, the starter interlock rod 44 entering and extending through the aligned openings 42 and 43. However, when either shaft or sleeve is moved from the neutral position, as shown in Figure 5 or 6, the starter interlock rod 44 may not be fully depressed as the openings 42 and 43 no longer are in alignment. Under these conditions, the button 46 may not be depressed sufficiently to operate the switch to close the starter circuit and energize the starter motor. A spring loaded detent ball 47 is mounted in the shaft 26 and urged into engagement with any one of three possible co-operating openings 48 in the sleeve 27, to secure resiliently the shaft and sleeve in the various relative positions of reciprocation. In Figure 7, since both shaft and sleeve are in neutral position, the detent is, of course, engaged in the central opening.

The operation of the device will, it is believed, be quite clear from the foregoing description. The structure is really relatively simple in conception and in manufacture, and yet it permits a positive actuation of the desired shifting fork with an absolutely positive locking of the other fork by direct means. Indeed, the interlock provided, despite its simplicity, is much more substantial and will better withstand the heavy service imposed upon it in tractor use than the ordinary types largely used in passenger-car manufacture. The component parts of the device are readily manufactured and need not be made to exceptionally narrow tolerances. The yoke, which is directly and automatically operated by the gearshift lever into either of the two locking positions, is equally simple to fabricate. Apart from the operation of the transmission itself, the starting switch interlock is positive in operation and the starter circuit cannot be closed unless both of the shifter forks are in neutral position. However, it does not suffer from the disadvantages which have existed in other interlocks using various auxiliary mechanisms, since, so long as the transmission is in working order, the starter interlock likewise will function both to prevent starter motor operation when the tractor is in gear and to permit it when it is in neutral. It will be noted that the shifter shaft mechanism occupies the space of but one of the shafts previously used, thereby simplifying the problem of mounting and of lubrication. The changing of gears is effected easily and crisply and the operating device can be manipulated quite as fast as any of those built on conventional principles.

It is realized that certain changes may be made in the precise structure shown in the drawings, but it is the intention to cover by the claims, such of the changes as are reasonably within the scope thereof.

The invention claimed is:

1. In a sliding gear transmission operating device for use with internal-combustion engines in automotive vehicles, comprising, a housing, a pair of spaced aligned shifting forks in said housing, a shift lever mounted externally of said housing movable in an H pattern to reciprocate selectively either of said shifting forks, a shaft supported at each end in said housing for reciprocation with respect thereto, a sleeve concentric with and reciprocally mounted on said shaft, one of said shifting forks being fixed for reciprocation with said shaft and the other of said shifting forks being fixed for reciprocation with said sleeve, a locking yoke pivotally mounted on said housing, and an operating fork operatively connected to said shift lever and selectively engaging for reciprocation said shaft or said sleeve and said yoke for pivotal movement, locking said sleeve or shaft, respectively, against reciprocation.

2. In a sliding gear transmission operating device for use with internal-combustion engines in automotive vehicles, comprising, a housing, a pair of spaced, aligned shifting forks in said housing, a shift lever mounted externally of said housing movable in an H pattern to reciprocate selectively either of said shifting forks, a shaft supported at each end in said housing for reciprocation with respect thereto, a sleeve concentric with and reciprocally mounted on said shaft, one of said shifting forks being fixed for reciprocation with said shaft and the other of said shifting forks being fixed for reciprocation with said sleeve, a locking yoke mounted on said housing for pivotal movement about an axis substantially parallel to said shaft, and an operating fork operatively connected to said shift lever and selectively engaging for reciprocation said shaft or said sleeve and said yoke for pivotal movement about said axis, locking said sleeve or shaft, respectively, against reciprocation.

3. In a sliding gear transmission operating device for use with internal-combustion engines in automotive vehicles, comprising, a housing, a pair of spaced aligned shifting forks in said housing, a shift lever mounted externally of said housing movable in an H pattern to reciprocate selectively either of said shifting forks, a shaft supported at each end in said housing for reciprocation with respect thereto, a sleeve concentric with and reciprocally mounted on said shaft, one of said shifting forks being fixed for reciprocation with said shaft and the other said shifting fork being fixed for reciprocation with said sleeve, a locking yoke mounted on said housing for pivotal movement about an axis substantially parallel to said shaft, an operating fork operatively connected to said shift lever and selectively engaging for reciprocation said shaft or said sleeve and said yoke for pivotal movement, locking said sleeve or shaft, respectively, against reciprocation, a depressible starter operating device mounted on said housing and having an interlocking rod normally extending adjacent the outer surface of said sleeve, an opening in said sleeve, a depression in said shaft, said opening and said depression being in alignment with said rod when said transmission is in neutral position.

4. In a transmission operating device for use with internal-combustion engines in automotive vehicles, comprising, a housing, a pair of spaced aligned shifting forks in said housing, a shift lever mounted externally on said housing movable in an H pattern to reciprocate selectively either of said shifting forks, a shaft supported at each end in said housing for reciprocation with respect thereto, a sleeve concentric with and reciprocally mounted on said shaft, one of said shifting forks being fixed for reciprocation with said shaft and the other of said shifting forks being fixed for reciprocation with said sleeve, a locking yoke mounted on said housing for pivotal movement about an axis substantially parallel to said shaft, an operating fork forming an extension of said shift lever, one side of said operating fork engaging said sleeve in one position of lateral deflection of said shift lever and the other side of said operating fork engaging said shaft in the other position of lateral deflection of said shift lever, said operating fork being effective on longitudinal deflection of said shift lever to reciprocate the shaft or sleeve engaged, and a yoke pivotally secured to said housing and movable with said operating fork, said yoke engaging said shaft when said one side engages said sleeve and engaging said sleeve when said other side engages said shaft, said yoke being effective to secure said shaft or sleeve engaged against the reciprocation.

5. In a sliding gear transmission operating device for use with an internal-combustion engine in automotive vehicles, comprising, a housing, a pair of longitudinally spaced aligned shifting forks in said housing, a shift lever mounted externally on said housing movable in an H pattern to reciprocate selectively either of said shifting forks, a shaft supported at each end in said housing for reciprocation with respect thereto, a sleeve concentric with and reciprocally mounted on said shaft, one of said shifting forks being fixed for reciprocation with said shaft and the other of said shifting forks being fixed for reciprocation with said sleeve, an operating fork connected with said shift lever, a pin on one side of said operating fork adapted to engage in an operating slot in said sleeve, a pin on the other side of said operating fork adapted to engage in an operating slot in said shaft oppositely disposed to the operating slot in said sleeve, a cutaway portion in said sleeve spaced longitudinally of said operating slot therein, a locking slot in said shaft exposed through said cutaway portion in said sleeve, a second cutaway portion on the other side of said sleeve exposing said operating slot in said shaft, a locking slot on said sleeve spaced longitudinally of said second cutaway portion thereon, said locking slots in said shaft and sleeve being transversely aligned when said transmission is in the neutral position, and a yoke means operable by said shift lever selectively engaging with one or the other of said slots to secure the respective member against reciprocation.

6. The structure of claim 5 which is further characterized in that said yoke has longitudinally extending means engaged by said operating fork to provide corresponding pivotal movement therefor.

7. A structure of claim 5 which is further characterized in that said yoke comprises a member pivotally mounted on each side of said operating fork and having sides engaged by said operating fork to effect the pivotal movement thereof, openings in each end of said yoke having edges adapted to engage in said locking slots on said sleeve or said shaft, there being two said cutaway areas on said one side of said sleeve substantially equally spaced on each side of the operating slot therein, a locking slot in said shaft corresponding to each of said cutaway areas in said sleeve, and two locking slots on the opposite side of said seleve, spaced outwardly of said cutaway portion thereon, said locking slots in said sleeve and said shaft being transversely aligned when the transmission is in neutral position.

8. The structure of claim 5 which is further characterized in that a depressible starter switch is mounted on said housing substantially vertically aligned with said shaft, a member secured to such depressible element and normally projecting downwardly to the vicinity of said sleeve, an aperture in said sleeve and a depression in said shaft, said aperture and said depression being normally aligned with said element only when said transmission is in neutral position and being then adapted to receive said element to permit the depression of said depressible element and operation of said starter switch.

9. In a sliding gear transmission operating device for use with internal-combustion engine in an automotive vehicle, comprising, a housing, a pair of spaced aligned shifting forks in said housing, a shift lever mounted externally of said housing in universally movable means and having an operating fork extending therefrom into said housing, a longitudinally extending shaft supported in each end in said housing for reciprocation with respect thereto, a sleeve concentric with and reciprocally mounted on said shaft, one of said shifting forks being fixed for reciprocation with said shaft and the other of said shifting forks being fixed for reciprocation with said sleeve, a locking yoke enclosing said operating fork and operated thereby for pivotal movement about an axis substantially parallel to said shaft, operating pins on each side of said fork adapted to engage said shaft or said sleeve selectively, said yoke being adapted to engage said shaft or sleeve when said operating fork engages the other said member, said shaft and said yoke restricting the movement of said shift lever to an H pattern.

10. A sliding gear transmission operating device for use with internal combustion engines, comprising, a housing, a shaft supported in said housing for reciprocation with respect thereto, a shifting fork carried by said shaft, a sleeve concentric with and reciprocably mounted on said shaft, a shifting fork carried by said sleeve, a shift lever extending externally of said housing, an operating fork connected to said shifting lever and selectively engaging for reciprocation said shaft or said sleeve, and means operated by said operating fork for locking said sleeve or shaft against reciprocation when said shaft or sleeve, respectively, are reciprocated.

DALE ROEDER.
HAROLD L. BROCK.

REFERENCES CITED

The following references are of record in the file of this patent:

UNITED STATES PATENTS

| Number | Name | Date |
| --- | --- | --- |
| 822,057 | Krebs | May 29, 1906 |
| 1,031,836 | Cameron | July 9, 1912 |
| 1,156,405 | Johnson | Oct. 12, 1915 |
| 1,638,182 | Butell | Aug. 9, 1927 |
| 1,659,284 | Smith | Feb. 14, 1928 |
| 2,358,643 | Kelley | Sept. 19, 1944 |